United States Patent [19]

Lenderking et al.

[11] Patent Number: 4,532,601
[45] Date of Patent: Jul. 30, 1985

[54] AUTOMATIC TEMPERATURE CALIBRATION METHOD AND APPARATUS

[75] Inventors: Bruce N. Lenderking, Glen Burnie, Md.; Robert D. Couch, New Freedom, Pa.

[73] Assignee: Westinghouse Electric Corp., Pittsburgh, Pa.

[21] Appl. No.: 409,688

[22] Filed: Aug. 19, 1982

[51] Int. Cl.³ ............................................. G06F 15/20
[52] U.S. Cl. ..................................... 364/571; 364/557
[58] Field of Search ................. 364/571, 557; 73/1 R

[56] References Cited

U.S. PATENT DOCUMENTS

| | | |
|---|---|---|
| 4,150,433 | 4/1979 | Kaniel ................................. 364/571 |
| 4,254,469 | 3/1981 | Whitely ............................... 364/571 |
| 4,303,984 | 12/1981 | Houvig ................................ 364/571 |
| 4,418,392 | 11/1983 | Hata .................................... 364/571 |
| 4,437,164 | 3/1984 | Branch ................................ 364/571 |
| 4,446,715 | 5/1984 | Bailey .............................. 364/571 X |

Primary Examiner—Edward J. Wise
Attorney, Agent, or Firm—Charles Lorin

[57] ABSTRACT

In a multiplexed and microprocessor-based data acquisition system involving temperature measurement with temperature resistor thermometer devices (RTD), automatic signal substitution for calibration is effected without physically interrupting the measurement signal path by taking three measurements between the three wires at the input and using with the microprocessor a cancellation algorithm.

6 Claims, 4 Drawing Figures

AUTOMATIC TEMPERATURE CALIBRATION METHOD AND APPARATUS

BACKGROUND OF THE INVENTION

The invention relates to multiple channel analog data acquisition systems in general, and more particularly to automatic calibration of a computerized system for temperature measurements.

Modern analog data acquisition systems use digital treatment with a computer centrally located and remote from local measuring points which are scanned or sequentially selected for initial testing and calibration concurrently with analog measurement.

Remote control and monitoring in a hostile evnironment involving high electrical noise and wide temperature variations require calibration measurement to insure the accuracy and performance expected for digital computer treatment and control with the derived information. Improved computer-based systems are desirable to be able to place high performance complex systems in very small packages. Microcomputer treatment has been further extended to the design and operation of the analog portion of the system, thus, right across the analog interface of the system. This has been done, in particular, for automatic calibration in multiple channel analog-to-digital data acquisition systems. See for instance U.S. Pat. Nos. 3,961,325; 3,975,727 and 4,016,557.

Calibration involves an initial correction and setting of the instrumentation to account for gain and offset errors, for inaccuracies associated with filters, current sources, thermocouple effects, and lead-lines inserted with the instrumentation.

One approach in the prior art when confronted with a computerized data acquisition system has been to merely reapply to digital systems the techniques already known for totally analog systems. This approach, however, requires signal substitution at the terminal points, or signal injection at some intermediary location in the system. In the first instance there is a need for disconnecting wires with the additional drawback of possible error in making the connections on the terminal block. In the second instance, test and calibration are effective only partially on the system. Short of automatic calibration, adjustments are made manually on a number of trimpots until the operator observes a predetermined level reached by the signal under consideration. Considering the large number of inputs in a multiplexed analog I/O subsystem, with a manual approach only the common hardware is compensated by calibration and a residual error remains. In order to minimize such residual error, the errors associated with each input may be called for and the calibration made on the common hardware be corrected with the average of the two most extreme detected errors. These procedures are tedious, costly, time consuming, and still they allow a residual error on most inputs.

A better approach than disconnecting wires consists in controlled switching, for testing purposes, of a special signal generator. This approach, however, also disconnects, if not manually, the main measurement signal paths. For increased reliability, this approach requires additional hardware to determine whether the measuring path has been properly reconfigured after calibration.

In contrast to prior art approaches, the present invention proposes in a multiplex data acquisition system to combine hardware and software in such a way that automatic signal substitution for calibration is provided without physically interrupting the measurement signal path of any of the selected channels.

SUMMARY OF THE INVENTION

The invention resides in autocalibration method and apparatus for a computerized multiplexed analog data acquisition system in which provision is made, locally, in association with a group of selectable analog measuring points, for a microprocessor-controlled testing sequence of error-zeroing and calibration steps which leaves the input lines from the measuring point alive, during testing as well as during measurement, continuously. The invention also resides in a microprocessor-controlled procedure for eliminating lead-line errors in temperature resistor thermometer device (RTD) measurement by sequentially switching ON and OFF connections with a common measurement line.

DESCRIPTION OF THE PREFERRED EMBODIMENTS

Figure 1:
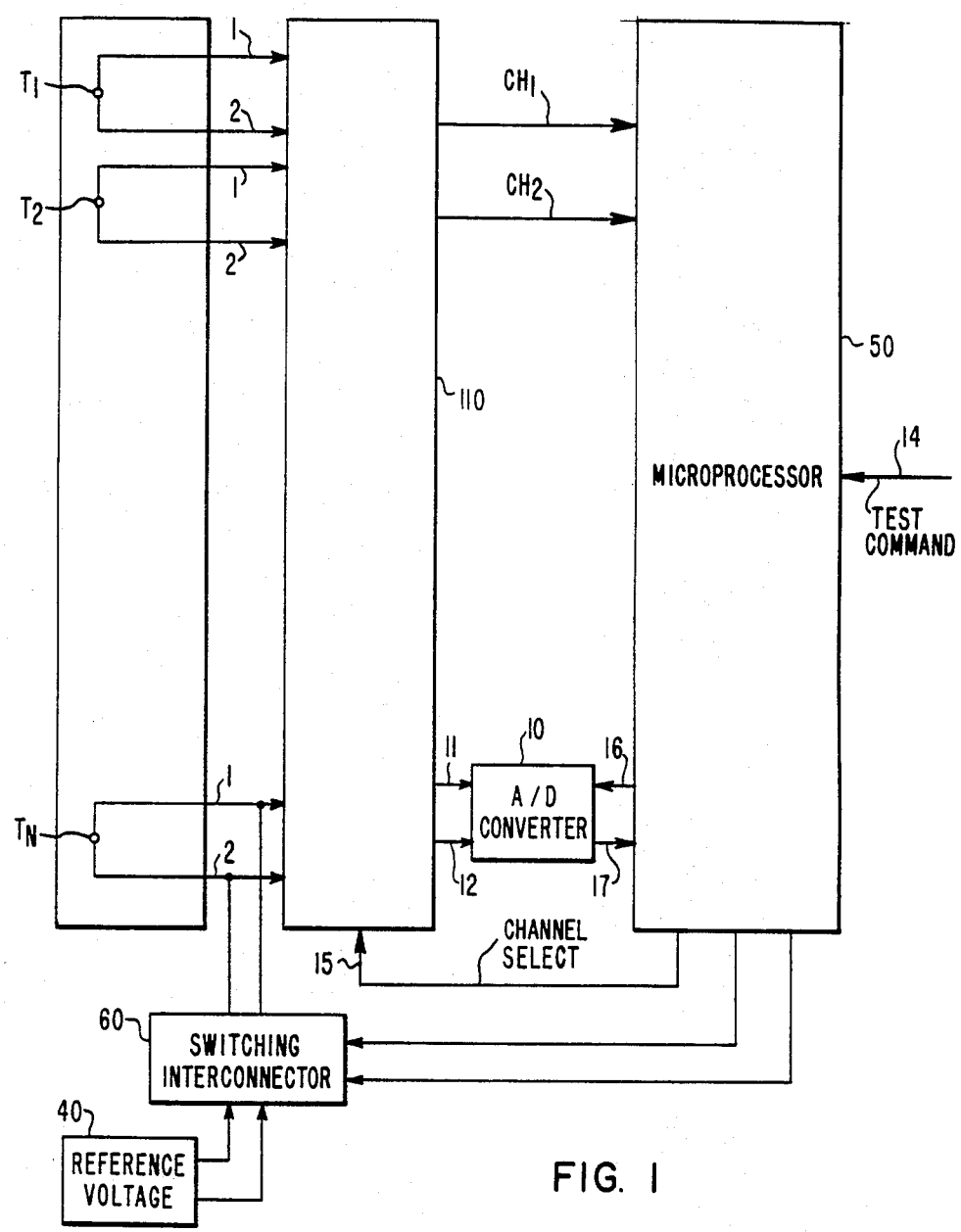
FIG. 1 is a schematic representation of a computerized multiplexed analog data acquisition system embodying the present invention.

Referring to FIG. 1 a multiplexed computerized data acquisition system includes a microprocessor 50 and n channels connected to remote locations $T_1, T_2, \ldots T_n$ where sensors are deriving analog data at respective measuring points. The present invention will be described in the context of temperature measurement and, typically, of sensing with either thermocouples, or resistance thermometer devices (RTD). An isolation and multiplexer circuit 110 provides isolation between the differential inputs on line 1,2 from each measuring point and the analog and digital treatment side of the computer for each channel $CH_1, CH_2 \ldots CH_n$. Any such channel includes an analog-to-digital (A/D) converter 10 responsive to the differential input of lines 11,12 from multiplexer 110 when selection by line 15 from the microprocessor to the multiplexer has selected the particular channel and initiated the A/D conversion process by the associated A/D converter 10. Converter 10 outputs on line 17, digital information for treatment by the microprocessor. In accordance with the present invention, a microprocessor 50 is associated with a number of channels located in proximity, for instance channels 1,2 . . . n, for the sake of simplicity of description. The microprocessor 50 is used for calibration initially of any particular measurement at any given measuring point $T_1, T_2 \ldots T_n$. The microprocessor is actuated via line 14 by a test command. A reference voltage source 40 is used in common by all the measuring points of the particular group $CH_1, CH_2, \ldots CH_n$ in the instance shown), and a switching interconnector 60 insures proper communication between reference voltage source 40, microprocessor 50 and any of the input lines 1,2 of the channels of the group. As will be explained, hereinafter, when an autocalibration and testing procedure is chosen microprocessor 50 establishes through the switching interconnector 60, a particular circuit by which reference voltage source 40 is substituted at the input of the channel for analog data at the chosen measuring point between lines 1 and 2. Microprocessor 50 also communicates back and forth with the A/D converter which is selected by lines 16,17 whereby data derived from the measuring point when the voltage source 40 is applied on lines 1,2 can be used by the microprocessor for offset error correction and gain adjustment during calibration of the particular channel. Once the testing procedure is terminated, the microprocessor transfers from th calibration mode into the measuring mode.

Figure 2:
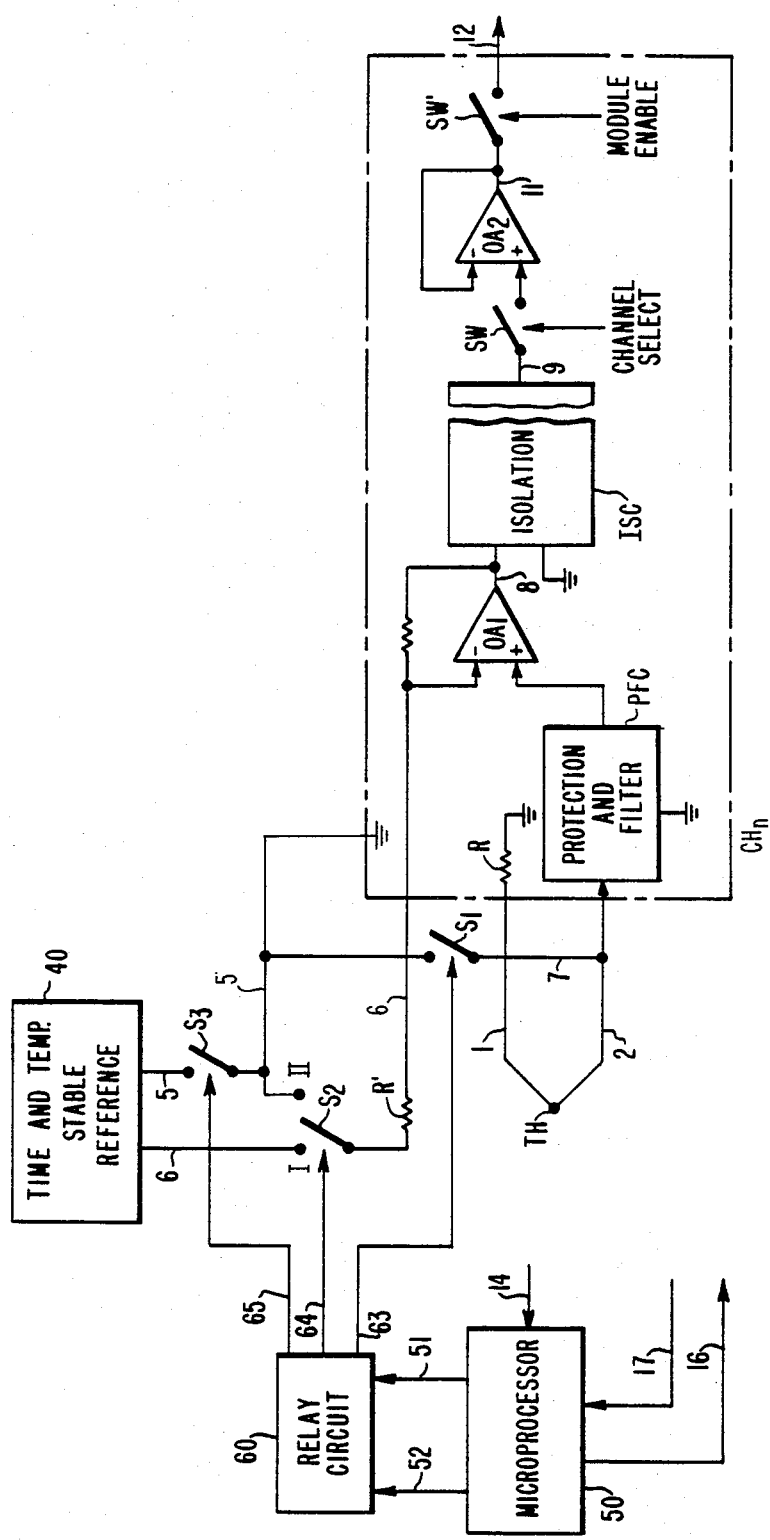
FIG. 2 illustrates schematically method and apparatus according to the invention for the autocalibration of a group of thermocouple sensing channels in a computerized multiplexed analog data acquisition system.

Referring to FIG. 2, a simplified diagram shows for one channel $CH_n$ the switching interconnector 60 in the instance of a thermocouple TH as sensor at the measuring point. One cable line 1 from the thermocouple is connected via a resistor R to ground. The other cable line 2 goes through a grounded protection and filter circuit PFC to the non-inverting input of an operational amplifier $OA_1$. A time and temperature stable reference voltage source 40 is connected by lead 5 via a switch $S_3$ to ground, and via a resistor R' and a switch $S_2$ by lead 6 to the inverting input of operational amplifier $OA_1$. Lead 2 which normally carry the thermocouple analog voltage to operational amplifier $OA_1$ is connected to ground through a switch $S_1$ by line 7.

The output of operational amplifier $OA_1$ is connected to another operational amplifier $OA_2$ by means of an isolation circuit ISC via lines 8 and 9. The output 11,12 of $OA_2$ is leading to the A/D converter of FIG. 1 (not shown here).

A relay combination circuit 60 is actuated by the microprocessor 50 according to a three-step logic defined on lines 51, 52. For calibration, the microprocessor first causes relay circuit 60 by line 64 to place switch $S_2$ into position II, whereby line 6 is connected to ground on line 5. At the same time by line 63 switch $S_1$ is closed, whereby line 2 is connected via line 7 also to ground on line 5. When this is done, the input on amplifier $OA_1$ are zero. Therefore, the output on line 8 should be zero. If, however, an offset b appears on line 8, the microprocessor, by line 17, stores the digital amount of the offset.

In a second step, microprocessor 50 causes relay circuit 60 to actuate switches $S_1$, $S_2$, $S_3$ in such a way that by line 63 switch $S_1$ remains closed, by line 65 switch $S_3$ is closed, and by line 64 switch $S_2$ is in position I. As a result, the known voltage between lines 5 and 6 becomes applied between the two inputs of operational amplifier $OA_1$. Therefore, a definite voltage $y_0$ appears on line 8 representing the known input $x_0$ from reference source 40. Since the offset b is known from the first step and has been stored in the microprocessor, the equation:

$$Y_0 = mx_0 + b_0$$

allows computation by the microprocessor of the gain $$m = (Y_0 - b)/x_0$$

Due to the amplifier configuration during the second step, a value $m+1$ is stored for m. A third step involves normal measurement from lines 1,2 and the thermocouple TH. The measuring mode is achieved when switch $S_1$ is open, switch $S_2$ is in its second positions II and switch $S_3$ is open. The unknown voltage at the input provides an output $Y_1$ which is measured, and from the stored values m and b the microprocessor computes $$x_1 = (Y_1 - b)/m$$

which is the measured value at location #1, ... or #n.

Such measurements and calibrations are effected for all the channels of a group e.g. which are common to the same reference voltage source 40, and microprocessor 50. The relay circuit 60, however, which is associated with the microprocessor controls separate sets of switches such as $S_1$, $S_2$, $S_3$ in each channel. Lines 51, 52 are multiplexed between all the channels of a group. The elements of a group are part of a module which combines up to four channels, typically. The isolation circuit ISC is also associated with a group. Switch SW' of FIG. 2 typifies channel selection by the central microcomputer between all channels. Switch SW chooses between lines 9 outputting from the isolation circuit ISC to an output amplifier $OA_2$ for the particular module, whereas switch SW' selects from the microcomputer the particular module, or group of channels. The local microprocessor 50 is connected to the output from output amplifier $OA_2$ to receive data representing m, or b, during autocalibration via line 17. The microprocessor outputs on lines 51, 52, the logic of which determines the pattern to be assumed by relay circuit 60. Within relay circuit 60 are coil relays which control contacts $S_1$, $S_2$, $S_3$.

The measurement method implemented by the embodiment of FIG. 2 allows for accurate absolute temperature measurements and for very accurate relative temperature measurements. The error in absolute temperature measurement depends upon the stability of the reference voltage source 40 and upon the non-linearity of the gain of the isolation amplifiers $OA_1$, $OA_2$ and ISC. Relative temperature measurement is effected with vary good accuracy when the same reference voltage source 40 is used in the automatic calibration of each channel of the same group, since any change in the reference voltage will be common to all channels, leaving the relative measurement unaffected. With the proposed system, the thermocouple signal line of lines 1, 2 is always connected, e.g., never disconnected. The invention is also applicable to a resistance thermometer device (RTD) type of sensor at any location $T_1 \ldots T_n$.

Figure 3:
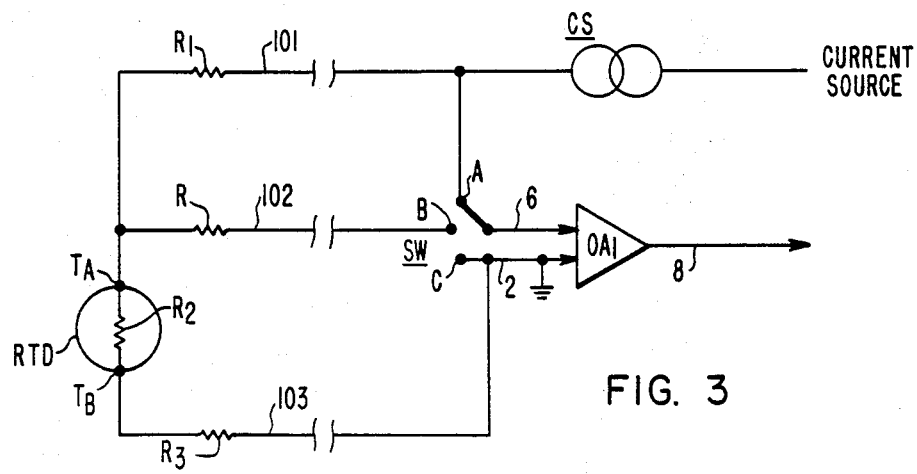
FIG. 3 is a circuit diagram illustrating method and apparatus according to the present invention for automatic lead-line error elimination in a resistance thermometer device in one channel of a computerized multiplexed analog data acquisition system.

Referring to FIG. 3, at the sensing point of the particular channel a resistance thermometer device (RTD) is used, rather than a thermocouple. These devices, as generally known, require a stable current source feeding into the internal resistance of the device. The problem here resides in lead resistance variations with temperature which would result in significant measurement error. FIG. 3 illustrates circuitry by which such an error is totally eliminated. As generally known, the RTD device is interfaced with the analog-to-digital converter symbolized by operational amplifier $OA_1$ and with the current source CS through a three-wire connection. Terminal TA goes through line 101 to the current source CS, while terminal TB goes through line 103 to ground G. The lead resistances are symbolized by a resistor $R_1$ for lead 101 and $R_3$ for lead 103. For the measurement, terminal $T_A$ is connected via line 102 to the input of line 6 to operational amplifier $OA_1$ and terminal $T_B$ is connected via line 103 to the grounded input of line 2. The lead resistance of line 102 is symbolized by a resistor R.

According to the prior art such three-wire arrangement is connected in a bridge so that the effects of lead wire resistance variations with distance and temperature are cancelled thereby to provide accurate measurement of temperatures. The bridge requires selection of resistors in circuit and initial adjustment whereby a null condition is established before each measurement by a differential amplifier.

In accordance with the present invention, there is no need to use a bridge. A switch SW allows to connect line 6 of the input of operational amplifier $OA_1$ to either line 101 in position A, line 102 in position B, or line 103 and ground in position C. Three successive measurements are made. First, with SW in position A, a voltage $^VAC_1$ is measured on line 8 between points A and C which leads to the following voltage:

$$^VAC_1 = IR_1 + IR_3 + IR_3,$$

where I is the current carried from the current source. The assumption is made that 101, 102 and 103 are leads having the same wire type, gauge and length and, therefore, have the same resistance. Therefore, $IR_1 = IR_3$.

Figure 4:
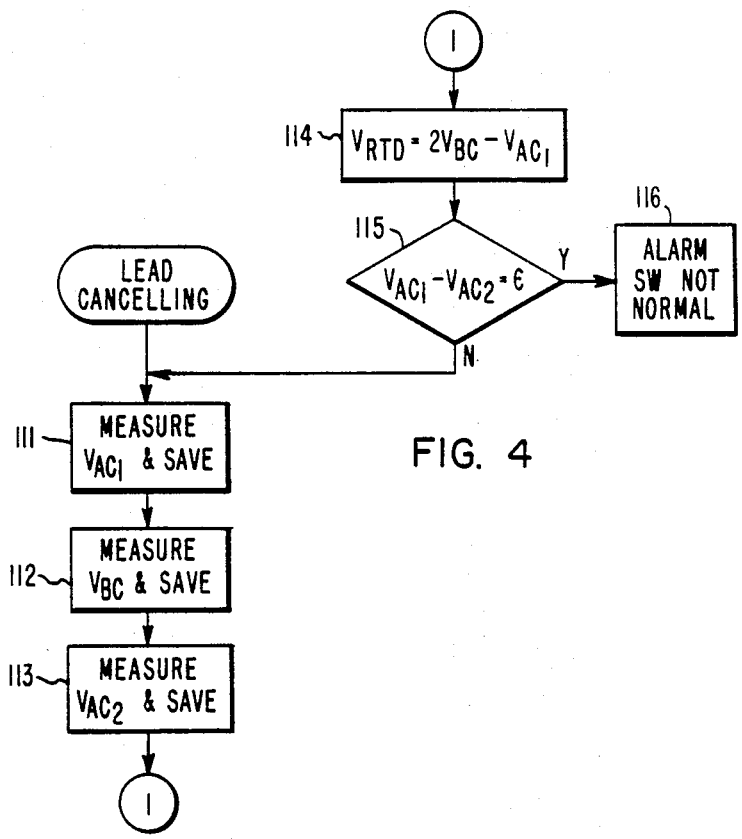
FIG. 4 is a flow chart illustrating the operation of a microprocessor controlling the configuration of the circuit of FIG. 3.

The method steps used with the assist of a microprocessor according to the present invention, for lead cancellation are illustrated by the flow chart of FIG. 4.

First at 111 the switch SW is set into position A. Accordingly, $^VAC_1$ is measured and saved by the microprocessor. Then at 112 switch SW is set into position B, $^VB_1$ is measured and saved by the microprocessor. The values so saved are used for the calculation at 114 of $V_{RTD} = IR_2 = 2V_{BC} - {}^VAC_1$. However, switch SW is immediately brought back to position A. The value $^VAC_2$ derived in the third step should be the same, or at least within a limit $\epsilon$, not much different from $^VAC_1$. The value of $^VAC_2$ measured at 113 is saved and used at 115 in order to raise the question whether $^VAC_1 - {}^VAC_2$ has exceeded the limit $\epsilon$. IF it has exceeded the limit, the reason may be either that a short term variation in the current I or in the temperature affects the truth of the algorithm, or that switch SW is not properly returned to position A. In such case, at 116 an alarm is set to cancel the information derived and make another trial. If, however, the value detected as $({}^AAC_1 - {}^VAC_2)$ does not cause an alarm, the system is in a proper condition, first, to use the value $V_{RTD}$ at the interface with the computer monitored digital system, then, to proceed with another measurement step from the particular resistance thermometer device RTD.

Therefore, the method of FIGS. 3 and 4 requires three measurements to allow for the cancellation of the effect of lead resistance and variations affecting the current source. Accordingly, an accurate temperature measurement is made possible with an RTD without having to use a bridge circuit. This scheme requires no adjustment, or component selections.

It is also observed that, with the arrangment of FIG. 3, when the switch is in position C, the zeroing mode is obtained, thereby allowing elimination of an offset error.

We claim:

1. In a multiplexed analog data acquisition system, for deriving on respective channel outputs signals representative of analog data at a plurality of respective measuring points with the assist of a reference source common to a group of such measuring points, the combination of:
   a microprocessor common to said group of measuring points;
   switching means controlled by said microprocessor in a first calibration mode for short-circuiting the input of a selected one of the output channels of said group, said microprocessor in said first calibration mode being responsive to said selected input to derive an offset error therefrom;
   said microprocessor controlling said switching means in a second calibration mode for switching said reference source at the input of said selected output channel, said microprocessor in said second calibration mode being responsive to said selected input to derive a reference output voltage therefrom;
   said microprocessor providing with said offset error and said reference output voltage an indication of the gain through said channel;
   said microprocessor controlling said switching means in a measurement mode to provide in relation to said selected channel an output signal representative of the derived analog data; and
   said microprocessor providing with said offset error and said gain indication, a calibrated representation of said analog data in relation to said representative output signal.

2. The system of claim 1 with said measuring point having thermocouple devices for measuring temperature; with said reference source being a voltage source of predetermined constant voltage amplitude.

3. The system of claim 1 with said measuring point having resistance thermometer devices (RTD's) for measuring temperature; with said reference source being a current source of predetermined constant current amplitude.

4. The system of claim 3 with said current source having a first lead line to one end of the RTD device in one channel; with said RTD device having a second lead line from said one end to one input terminal of said channel; a third lead line from the other end of said RTD device to the other input terminal of said channel;
   second switching means controlled by said microprocessor being provided for alternately connecting said one input terminal to either of said first lead and second lead lines;
   said microprocessor deriving analog data from said RTD from a calculation of
   $V_{RTD} = 2V_{BC} - {}^VAC_1$ where $V_{RTD}$ is the calculated analog data, $V_{BC}$ the output derived when said second switching means is connected to said second lead line; $^VAC_1$ is the output derived when said second switching means is connected to said first lead line.

5. In a temperature measurement arrangement comprising a resistance thermometer device RTD energized from a current source between a first lead line from a first pole thereof and a second lead line from a second pole thereof to ground;
   an operational amplifier for deriving a signal representative of the voltage drop $V_{RTD}$ across the internal resistance of said RTD device from said second lead to ground and from a third lead thereto;
   the method comprising the steps of:
   measuring at the end of said first and third lead lines from the RTD device the voltage drop $^VAC_1$ thereacross; measuring at the end of said second and third lead lines from the RTD device the voltage drop $V_{BC}$ thereacross;

deriving the voltage drop $V_{RTD}$ across the internal resistance of said RTD device by calculating $V_{RTD} = 2V_{BC} - {}^V\!AC_1$; thereby to cancel any lead line error due to lead wire resistance variations with distance and temperature.

6. The method of claim 5 with the additional step of measuring at the end of the two lead lines from the RTD device the voltage drop ${}^V\!AC_2$ thereacross; comparing ${}^V\!AC_2$ with ${}^V\!AC_1$ to establish reliability of measurement; and accepting the derived value of $V_{RTD}$ after said comparing step.

* * * * *